H. L. IDE.
PHOTOGRAPHIC CAMERA.
APPLICATION FILED OCT. 21, 1916.
1,235,320.
Patented July 31, 1917.
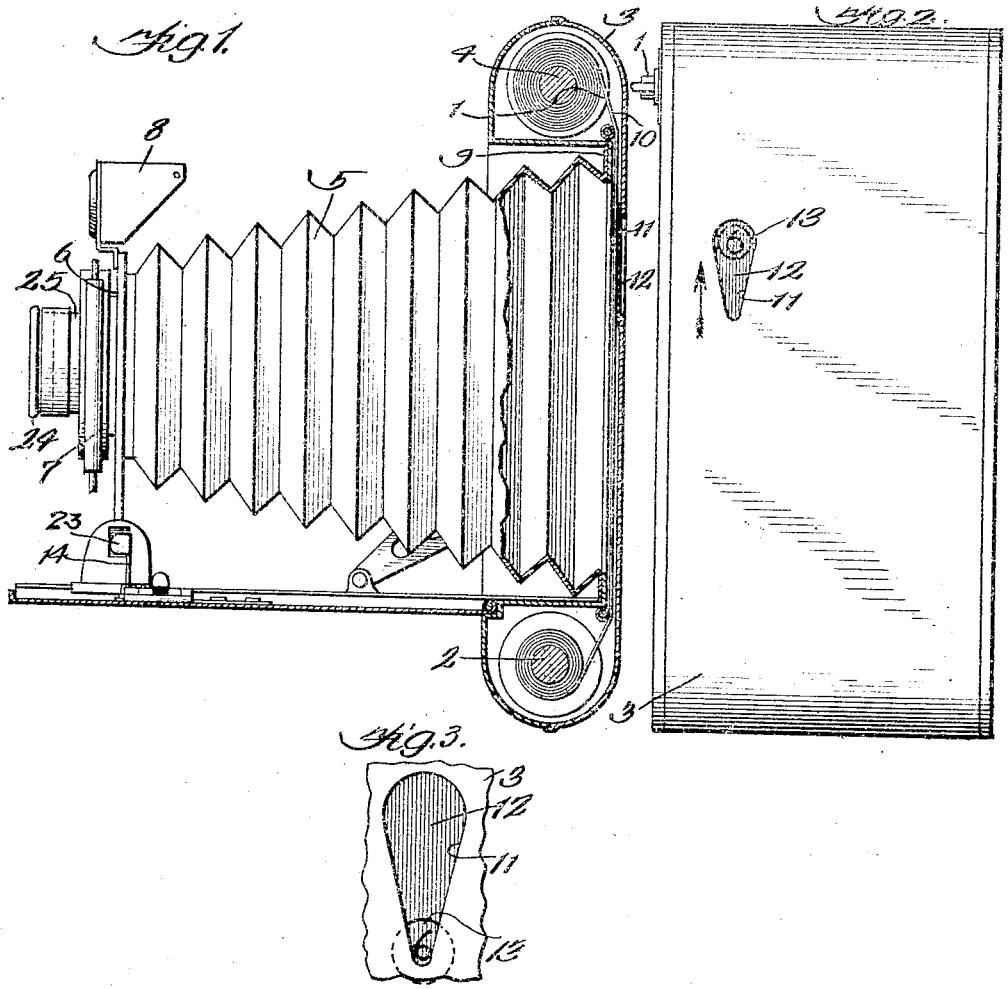
Inventor:
Harry L. Ide.
By G. L. Gregg
Atty.

UNITED STATES PATENT OFFICE.

HARRY L. IDE, OF SPRINGFIELD, ILLINOIS, ASSIGNOR OF ONE-HALF TO ROY W. IDE, OF SPRINGFIELD, ILLINOIS.

PHOTOGRAPHIC CAMERA.

1,235,320.  Specification of Letters Patent.  Patented July 31, 1917.

Application filed October 21, 1916. Serial No. 126,822.

*To all whom it may concern:*

Be it known that I, HARRY L. IDE, a citizen of the United States, residing at Springfield, in the county of Sangamon and State of Illinois, have invented a certain new and useful Improvement in Photographic Cameras, of which the following is a full, clear, concise, and exact description, reference being had to the accompanying drawings, forming a part of this specification.

My invention relates to a photographic camera including a ribbon of film forming a plurality of negative producing portions which have differentiating or designating characters applied thereto that are located in the line of travel of the ribbon of film.

The object of my invention is to modify the shape of the opening before which the differentiating or designating characters appear to inform the user when the film winding should cease. Hitherto these openings have been circular, on which account warning signals or marks had to be supplied in advance of the designating characters to warn the camera user to slow down the winding operation. By means of my invention I am enabled to eliminate these warning devices by elongating the opening in the line of travel of the designating characters through which the designating characters appear whereby the designating characters themselves, or portions thereof, are maintained in view for a considerable period of time, thus themselves acting to warn the camera user to slow down the winding operation.

In the preferred embodiment of the invention the end of the opening at which the designating characters appear is smaller than the other end of the opening and I also desirably converge the sides of the opening to the narrow end thereof.

I will explain my invention more fully by reference to the accompanying drawing showing the preferred embodiment thereof and in which Figure 1 illustrates a folding camera partially in section and partially in elevation; Fig. 2 is a back view of the camera shown in Fig. 1; and Fig. 3 is a view of a part of the camera as illustrated in Fig. 2 showing the backing paper or strip in a different position from that in which it is shown in Fig. 2.

Like parts are indicated by similar characters of reference throughout the different figures.

In the camera illustrated the sensitized elements that are to form the photographic negatives are embodied in a flexible element 1 commonly called a ribbon of film which is supplied to the user on a supply spool 2 that is removably inserted in the lower end of a camera casing 3 and from which supply spool the film is led to the winding or receiving spool 4. In the form of camera selected for the purpose of illustrating the invention there is included a bellowslike element 5 which tapers to its forward end at which it is connected with the camera "front" or lens carrier that is provided with the usual lens (of which the frame 6 is shown), the shutter, of which an actuating dash pot 7 is shown, and finder 8, all as is well understood by those familiar with the art. The rear of the bellowslike element 5, as is well known, is attached to the border portion 9 of the casing 3 and defines, with the border portion 9, the extent of the area of the film which is to be exposed to the light in photographic operation.

The film is provided with a backing strip 10 that is opaque to the passage of actinic light. As usual, this backing strip is marked at intervals with numbers or characters designating the different film sections that are to form the negatives, and while I prefer this method of applying or coupling the designating numbers or characters to the negative producing portions of the film, I do not wish to be limited thereto. These numbers are located in a line that is parallel with the longitudinal edges of the backing strip and consequently substantially parallel with the longitudinal edges of the camera casing 3 and the line of travel of the film. The back of the camera casing is provided with an opening 11 that is preferably covered by some suitable material that will prevent the passage of actinic light, a suitable material being a ruby celluloid as indicated at 12. The opening 11 is located and elongated in the line of travel of the negative producing portion designating numbers, the number six shown indicating the sixth negative producing portion of the film, this number being indicated beneath the covering 12 of the opening 11 in Fig. 2, this number six being indicated in the act of passing into register with the opening 11, in Fig. 3. Hitherto openings in the backs of cameras having the position of the opening 11 have been made circular because of which films have frequently been wound too far upon their receiving spools, particularly when the film is being wound at a high rate of speed, causing the negatives to overlap. To guard against the tendency of the camera users to over-wind the films, warning hands have been placed upon the backing strips in advance of the number 1 designating the first negative producing portions of the films and in position to appear beneath the display openings in the backs of the cameras before the figures one appear at the display openings. The other designating numbers of the negative producing portions of the films have been preceded by series of dots which would appear beneath the display openings in advance of the numbers to which these series pertain to warn the camera users to slow down in their winding operations.

In practising my invention I elongate the display opening 11 in the line of travel of the film in its movement to the receiving spool so that the designating number moving beneath the opening will travel for an appreciable distance within view of the camera user whereby each designating number will itself furnish sufficient warning without the aid of any auxiliary warning marks such as the hands or dots. This elongated opening is desirably tapered oppositely to the direction in which the film moves to the receiving spool, the last end of the opening (the end at which the designating figure should stop) being desirably curved to substantially the same curvature as a part of the circle 13 that generally surrounds each negative producing portion designating number, though my invention is adapted for use in connection with films having backing strips upon which designating numbers appear that are not surrounded by circles. The longitudinal sides of the opening 11 converge or approach each other on a sharp angle, so that a part only of the number coming into register with the opening will appear, the number gradually coming to full view after the sharp end of the opening is passed and the circle surrounding the number coming to complete view when the number is near the larger or last end of the opening. I also prefer the tapered shape of the elongated opening 11 since by such a shape the back of the casing in which the opening is formed is not materially weakened by changing the opening from a circular form to an elongated form. Moreover, the user is invited to bring the number to the larger end of the opening rather than to stop with the number elsewhere appearing since the number and its surrounding circle are brought to fullest view when they are in register with the large end of the opening. By means of my construction the advantages recited are gained without making it necessary to lessen the speed with which the film is wound upon the receiving spool and as a matter of fact the speed of the winding may be increased without the danger of winding by the display opening.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A photographic camera of the class employing a ribbon of film forming a plurality of negative producing portions which have differentiating characters located in the line of travel of the film, the camera casing having an opening located and elongated in the line of travel of the designating characters, the end of the opening at which the designating characters first appear being smaller than the other end of the opening.

2. A photographic camera of the class employing a ribbon of film forming a plurality of negative producing portions which have differentiating characters located in the line of travel of the film, the camera casing having an opening located and elongated in the line of travel of the designating characters, the end of the opening at which the designating characters first appear being smaller than the other end of the opening, the sides of the opening converging to the narrow end thereof.

In witness whereof, I hereunto subscribe my name this 17th day of October, A. D. 1916.

HARRY L. IDE.

Witnesses:
G. L. CRAGG,
ETTA L. WHITE.

Copies of this patent may be obtained for five cents each, by addressing the "Commissioner of Patents, Washington, D. C."